US006860564B2

(12) United States Patent
Reed et al.

(10) Patent No.: US 6,860,564 B2
(45) Date of Patent: Mar. 1, 2005

(54) VEHICULAR SEAT ASSEMBLY HAVING A CAM DRIVEN SELF POSITIONING HEAD RESTRAINT

(75) Inventors: Steven James Reed, Pinckney, MI (US); Carl J. Holdampf, Farmington Hills, MI (US); Louis W. Smoltz, South Lyon, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/470,866

(22) PCT Filed: Jan. 31, 2002

(86) PCT No.: PCT/US02/02970

§ 371 (c)(1),
(2), (4) Date: Jan. 22, 2004

(87) PCT Pub. No.: WO02/060723

PCT Pub. Date: Aug. 8, 2002

(65) Prior Publication Data

US 2004/0113480 A1 Jun. 17, 2004

Related U.S. Application Data

(60) Provisional application No. 60/265,222, filed on Jan. 31, 2001.

(51) Int. Cl.[7] .............................. B60N 2/20; B60N 2/48; A47C 7/38
(52) U.S. Cl. ..................... 297/408; 297/61; 297/378.12
(58) Field of Search ............................. 297/408, 378.1, 297/378.12, 378.14, 61, 278.1, 278.12

(56) References Cited

U.S. PATENT DOCUMENTS 469,357 A * 2/1892 Meigs ......................... 297/61

| 2,947,352 A | * | 8/1960 | Schliephacke | ................ 297/61 |
| 3,074,758 A | * | 1/1963 | Schliephacke | ................ 297/61 |
| 3,102,753 A | * | 9/1963 | Schliephacke | ................ 297/61 |
| 4,765,683 A | * | 8/1988 | Hattori | .................... 297/408 X |
| 5,003,240 A | * | 3/1991 | Ikeda | ..................... 297/408 X |

(List continued on next page.)

FOREIGN PATENT DOCUMENTS

| DE | 19645685 | 11/1996 |
| FR | 1244928 | 9/1959 |
| GB | 2337925 | 8/1999 |

Primary Examiner—Rodney B. White
(74) Attorney, Agent, or Firm—Clark Hill PLC

(57) ABSTRACT

A seat assembly comprises a seat cushion having front and rear portions, and a seat back having upper and lower portions. The seat back is operatively connected at the lower portion to the rear portion of the seat cushion for pivotal movement relative to the seat cushion between a plurality of reclined seating positions and a forwardly folded flat position. The seat back further includes a front surface for supporting the back of an occupant seated on the seat assembly. A head restraint having a front surface for supporting the head of the occupant seated on the seat assembly is pivotally coupled to the upper portion of the seat back and moveable relative to the seat back between a plurality of angled head supporting positions and a forwardly folded stowed position defined by the front surface of the head restraint being generally perpendicular to the front surface of the seat back. The seat assembly further includes a mechanism operatively interconnecting the head restraint to the seat back for providing automatic and continuous pivotal adjustment of the head restraint to one of the head supporting positions in response to pivotal adjustment of the seat back to one of the reclined seating positions. The mechanism further provides automatic and continuous pivotal movement of the head restraint between one of the head supporting positions and the stowed position in response to pivotal adjustment of the seat back between one of the reclined sealing positions and the forwardly folded positions.

14 Claims, 10 Drawing Sheets

U.S. PATENT DOCUMENTS

| | | | | |
|---|---|---|---|---|
| 5,006,771 A | * | 4/1991 | Ogasawara | 297/408 X |
| 5,011,225 A | * | 4/1991 | Nemoto | 297/408 |
| 5,011,226 A | * | 4/1991 | Ikeda et al. | 297/408 |
| 5,181,758 A | * | 1/1993 | Sandvik | 297/408 X |
| 5,222,784 A | * | 6/1993 | Hamelin | 297/408 |
| 5,288,129 A | * | 2/1994 | Nemoto | 297/408 X |
| 5,520,435 A | * | 5/1996 | Fujimoto et al. | 297/61 |
| 5,558,403 A | | 9/1996 | Hammoud et al. | 297/378.12 |
| 5,669,666 A | * | 9/1997 | Lee | 297/408 |
| 5,681,079 A | * | 10/1997 | Robinson | 297/61 |
| 5,738,411 A | * | 4/1998 | Sutton et al. | 297/378.12 |
| 5,826,942 A | * | 10/1998 | Sutton et al. | 297/378.12 |
| 6,074,011 A | * | 6/2000 | Ptak et al. | 297/408 |
| 6,364,414 B1 | * | 4/2002 | Specht | 297/408 X |
| 6,485,096 B1 | * | 11/2002 | Azar et al. | 297/61 |
| 6,663,181 B2 | * | 12/2003 | Nygren et al. | 297/408 |
| 2004/0017099 A1 | * | 1/2004 | O'Connor | 297/61 |
| 2004/0026964 A1 | * | 2/2004 | Edrich et al. | 297/61 |

* cited by examiner

VEHICULAR SEAT ASSEMBLY HAVING A CAM DRIVEN SELF POSITIONING HEAD RESTRAINT

This application claims the benefit of Provisional Application No. 60/265,222, filed Jan. 31, 2001.

BACKGROUND OF THE INVENTION

1. Field of Invention

The subject invention relates to a seat assembly for an automotive vehicle, and more particularly, to a mechanism for automatically and continuously adjusting the angular position of a head restraint in response to pivotal movement of a seat back relative to a seat cushion.

2. Description of the Related Art

Automotive vehicles include vehicle seat assemblies for supporting an occupant in a vehicle. The seat assemblies comprise a seat cushion and a seat back, typically pivotally mounted to the seat cushion by a recliner mechanism The seat back is pivotal between a plurality of reclined seating positions and a forwardly folded flat position. The seat assemblies also commonly comprise a head restraint coupled to the seat back for supporting the seat occupant's head. Typically, the height or pivotal displacement of the head restraint may be adjusted, either manually or by power actuation, regardless of the position of the seat back.

It remains desirable to provide a mechanism for automatically and continuously adjusting the angular position of the head restraint relative to the seat back in response to the pivotal adjustment of the seat back.

SUMMARY OF THE INVENTION

According to one aspect of the invention, a seat assembly is provided comprising a seat cushion extending between front and rear portions. A seat back having a front surface for supporting the back of an occupant seated on the seat cushion and extending between an upper portion and a lower portion is operatively connected to the rear portion of the seat cushion for pivotal movement relative to the seat cushion between a plurality of reclined seating positions. A head restraint having a front surface for supporting the head of the occupant seated on the seat cushion is pivotally coupled to the upper portion of the seat back for movement relative to the seat back between a plurality of angled head supporting positions. A mechanism operatively interconnects the head restraint and the seat back for providing automatic and continuous pivotal movement of the head restraint to one of the head supporting positions in response to pivotal adjustment of the seat back to one of the reclined seating positions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
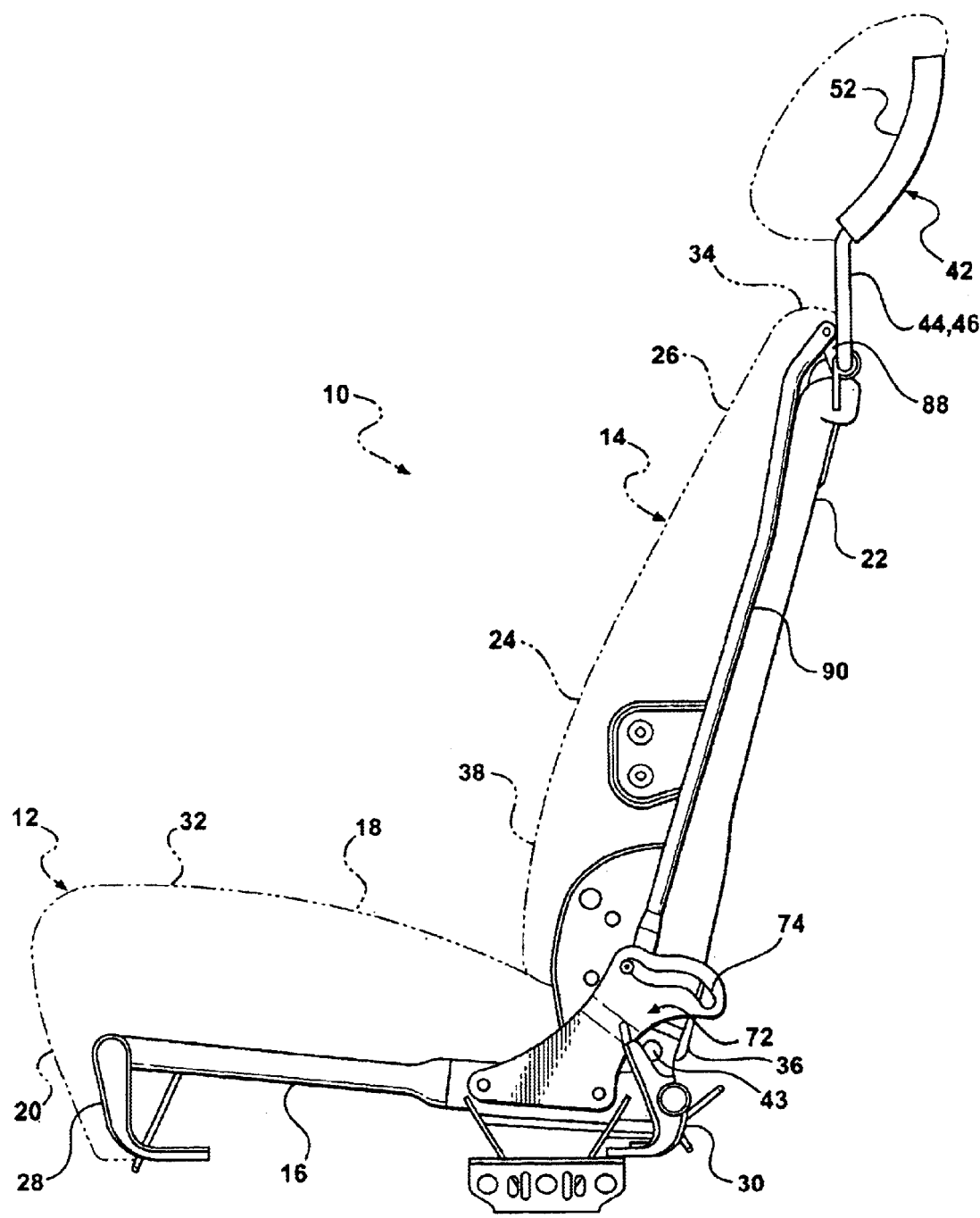
FIG. 1 is a side view of the seat assembly with the seat back in an upright seating position.

Referring to the Figures wherein like numerals indicate like or corresponding parts through the several views, FIG. 1 discloses a seat assembly 10 for use in an automotive vehicle. The seat assembly 10 includes a generally horizontal seat cushion assembly 12 and a seat back assembly 14. The seat cushion assembly 12 includes a seat cushion frame 16 supporting a resilient contoured cellular foam pad 18 encased in a trim cover 20 of cloth, leather, vinyl or the like, for supporting an occupant in the seat 10. Similarly, the seat back assembly 14 includes a seat back frame 22 supporting a resilient contoured cellular foam pad 24 encased in a trim cover 26 as is commonly known to one skilled in the art. The seat cushion 12 has opposite and spaced apart front and rear portions 28, 30 and atop supporting surface 32. The seat back 14 has opposite and spaced apart upper and lower portions 34, 36 and a front surface 38 for supporting the back of an occupant supported in the seat 10.

Figure 2:
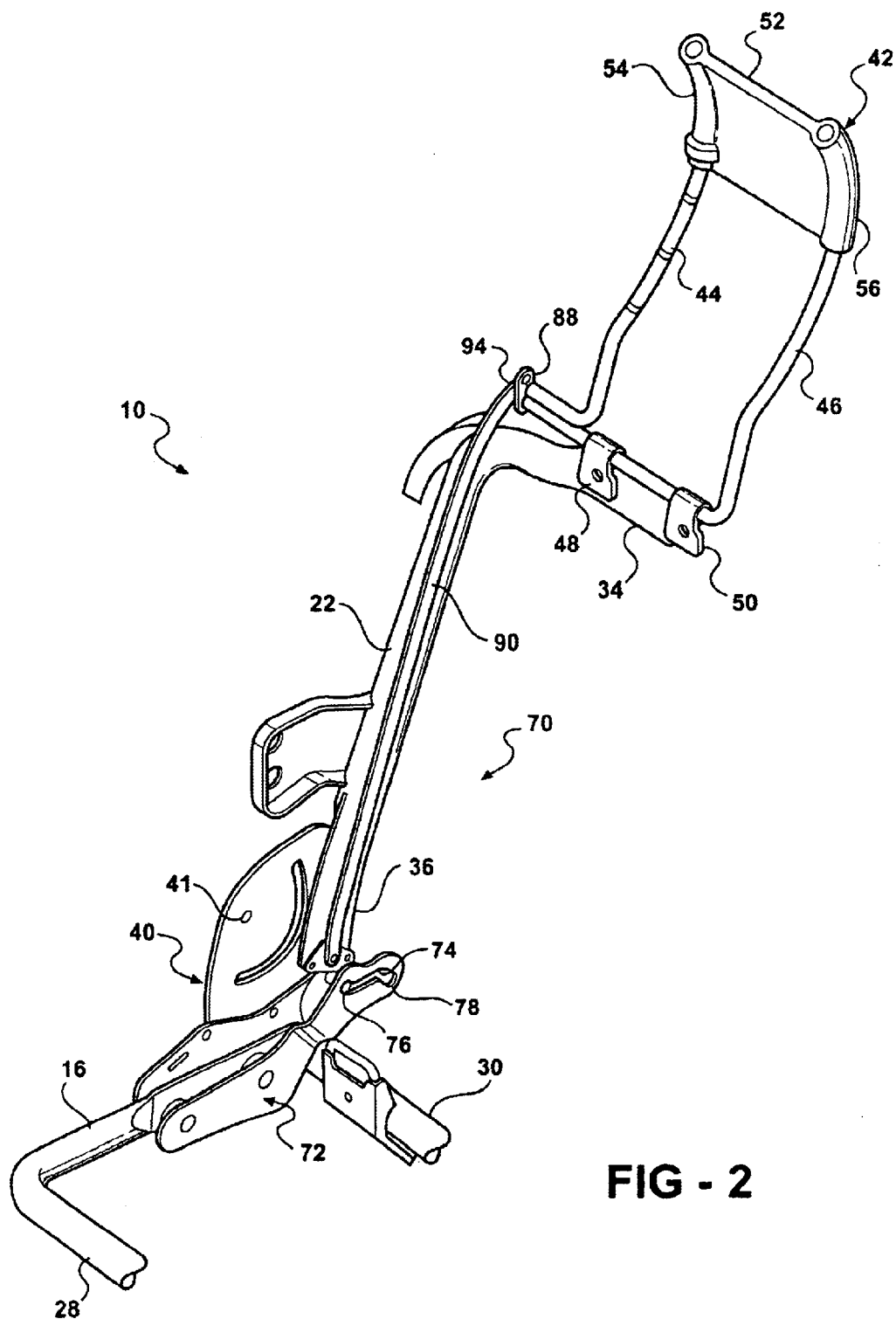
FIG. 2 is a perspective view of the seat assembly according to the aspects of the present invention.
Figure 10:
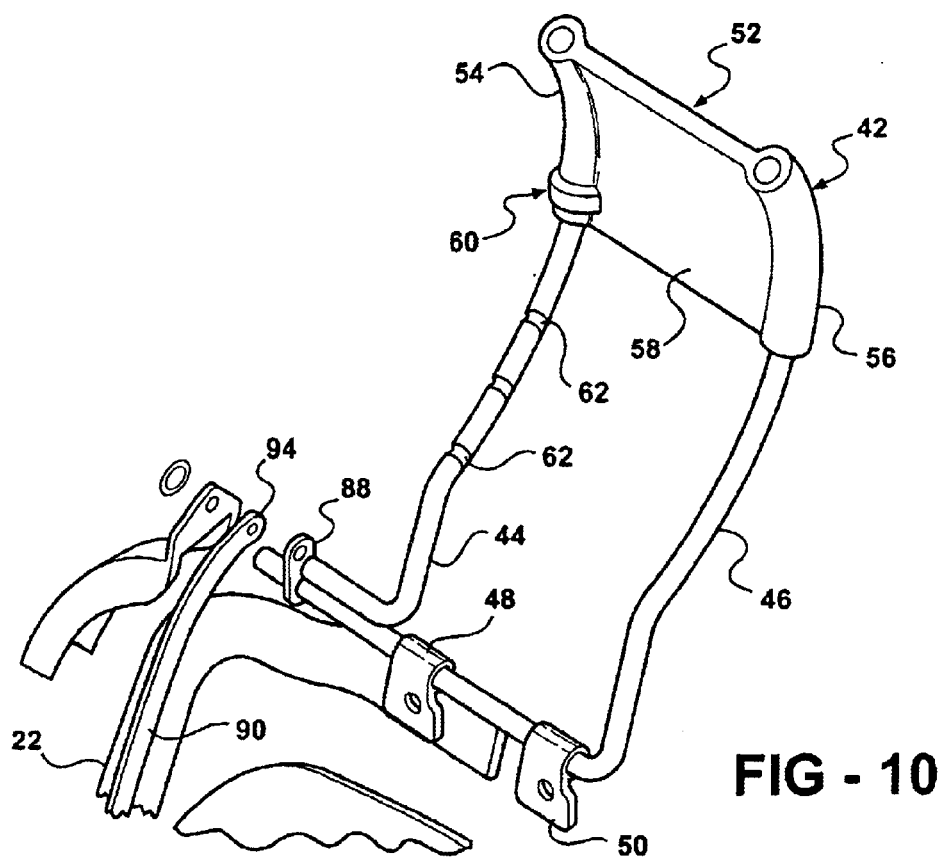
FIG. 10 is a partially exploded perspective view of the head restraint of the seat assembly.

Referring to FIG. 2, the seat back frame 22 is operatively and pivotally connected at its lower portion 36 to the rear portion 30 of the seat cushion frame 16 by a recliner mechanism 40 having a first pivot axis 41 and a second pivot axis 43. The recliner mechanism 40 provides pivotal movement of the seat back 14 about the second pivot axis 43 between a plurality of reclined seating position defined generally between an upright position shown in FIGS. 1 and 2, and a fully reclined position, shown in FIG. 3. The recliner mechanism 40 further provides pivotal movement of the seat back 14 about the first pivot axis 41 between one of the reclined seating positions and a forwardly folded flat position overlying the seat cushion 12, shown in FIG. 10, as is commonly known to one having ordinary skill in the art. An exemplary recliner mechanism is disclosed in U.S. Pat. No. 5,558,403 issued on Sep. 24, 1996 and incorporated herein by reference in its entirety.

Figure 14:
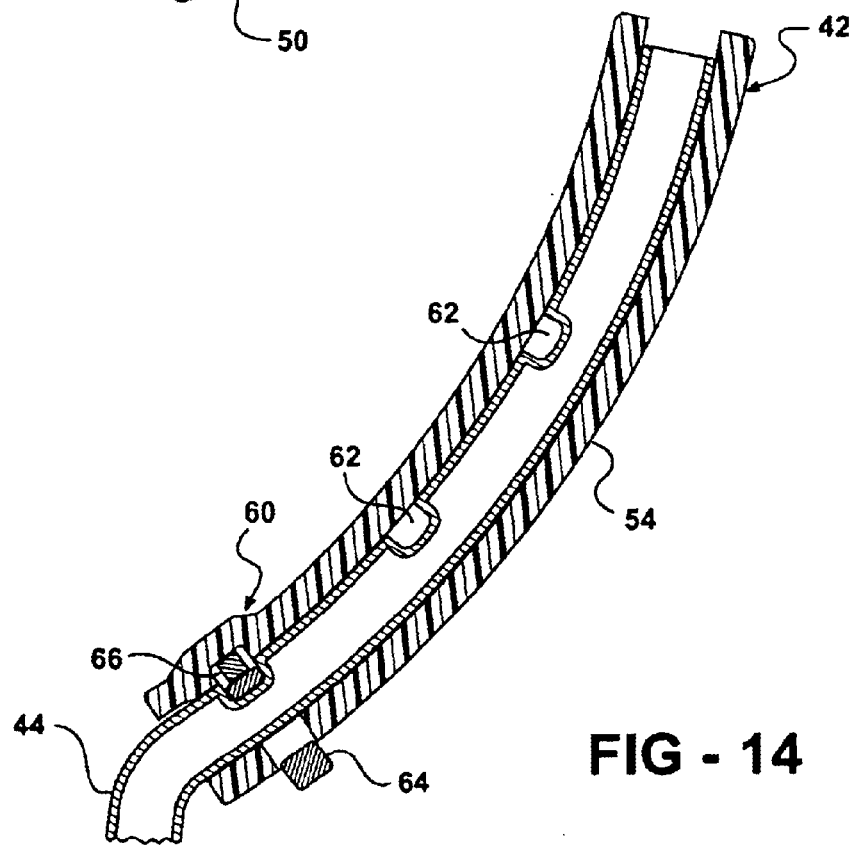
FIG. 14 is a side view of the head restraint.

The seat assembly 10 further includes a head restraint assembly 42 operatively coupled to the upper portion 34 of the seat back frame 22 for supporting the head of an occupant seated in the seat 10. Referring to FIGS. 10–14, the head restraint assembly 42 includes a pair of spaced apart head restraint posts 44, 46 pivotally coupled to the seat back frame 22 by a pair of pivot brackets 48, 50 for providing pivotal movement of the head restraint assembly 42 relative to the seat back 14 between a plurality of angled head supporting positions, spaced and angled relative to the front surface 38 of the seat back 14, and a forwardly folded stowed position, generally perpendicular to the front surface 38 of the seat back 14, as will be described in further detail below. Each of the posts 44, 46 is generally arcuate shaped from end to end. However, it should be appreciated that the posts 44, 46 may be straight. The head restraint assembly 42 further includes a head restraint shell 52. The shell 52 includes a pair of hollow collars 54, 56 spaced apart and interconnected by an arcuate center plate 58. The posts 44, 46 are sidably received within the respective hollow collars 54, 56 to allow the shell 52 to slide along the posts 44, 46 and provide height and position adjustment of the head restraint 42 relative to the occupant seated in the seat 10. A locking mechanism 60 releasably locks the shell 52 with the posts 44, 46 in various adjustable positions there along. The locking mechanism 60 includes a plurality of spaced apart notches 62 formed in at least one of the posts 44 for receiving a spring bias locking button 64 housed within one of the collars 54. A spring 66 is compressed between the button 64 and the collar 54 to urge the button 64 into locking engagement with one of the notches 62 in the post 44 as shown in FIG. 14. In operation, to adjust the head restraint 42, the operator depresses the button 64 against the force of the spring 66 to release the button 64 from the notch 62. The shell 52 is now free to slide vertically along the posts 44, 46 until the button 64 is received within the next notch 62 to lock the head restraint in a desired adjusted position.

Referring again to FIG. 2, the seat assembly 10 further includes a mechanism 70 operatively interconnecting the head restraint assembly 42 and the seat back assembly 14 for providing automatic and continuous pivotal adjustment of the head restraint 42 to one of the head supporting positions in response to pivotal adjustment of the seat back 14 to one of the reclined seating positions. The mechanism 70 further provides automatic pivotal movement of the head restraint 42 to the forwardly folded stowed position in response to pivotal movement of the seat back 14 from one of the reclined seating positions to the forwardly folded flat position.

The mechanism 70 includes a cam plate 72 fixed secured to the seat cushion frame 16 adjacent to the seat back frame 22. The cam plate 72 includes a distal end having a curved cam slot 74 formed therein. The cam slot 74 extends between first and second ends 76, 78, as shown best in FIG. 4. The cam slot 74 includes a predetermined curved profile defined by spaced apart and parallel side edges 75, 77 extending between the first and second ends 76, 78. The cam slot 74 in the preferred embodiment is generally S-shaped, or sinusoidal shaped, however, may be any profile or configuration desired for controlling the pivotal movement of the head restraint 42. The mechanism 70 further includes a rocker arm 80 having a first end 82 pivotally connected to the seat back frame 22 at pivot 83 and an opposite second end 84 coupled to the cam plate 72. A roller 86 is rotatably assembled to the second end 84 of the rocker arm 80 at pivot 87 and received, or caged, between the side edges 75, 77 within the cam slot 74 for rotational or sliding movement therein between the first and second ends 76, 78.

Figure 3:
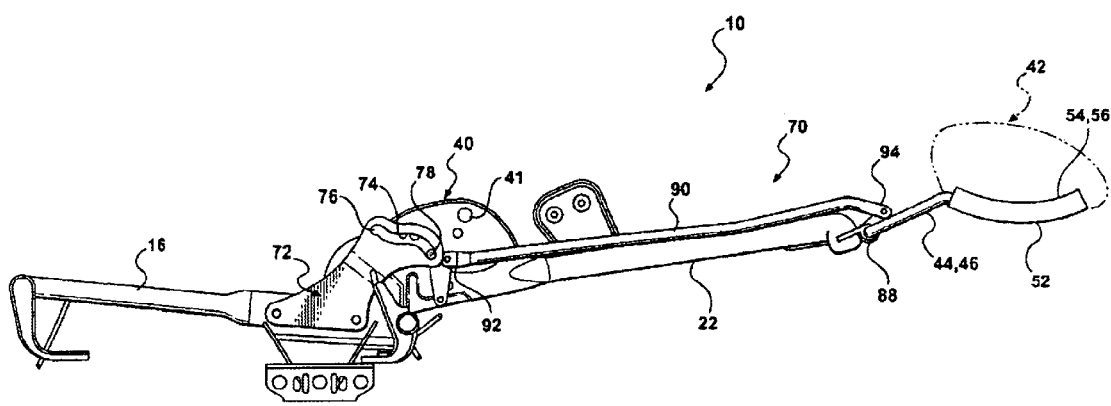
FIG. 3 is a side view of the seat assembly with the seat back in a fully reclined seating position.
Figure 4:
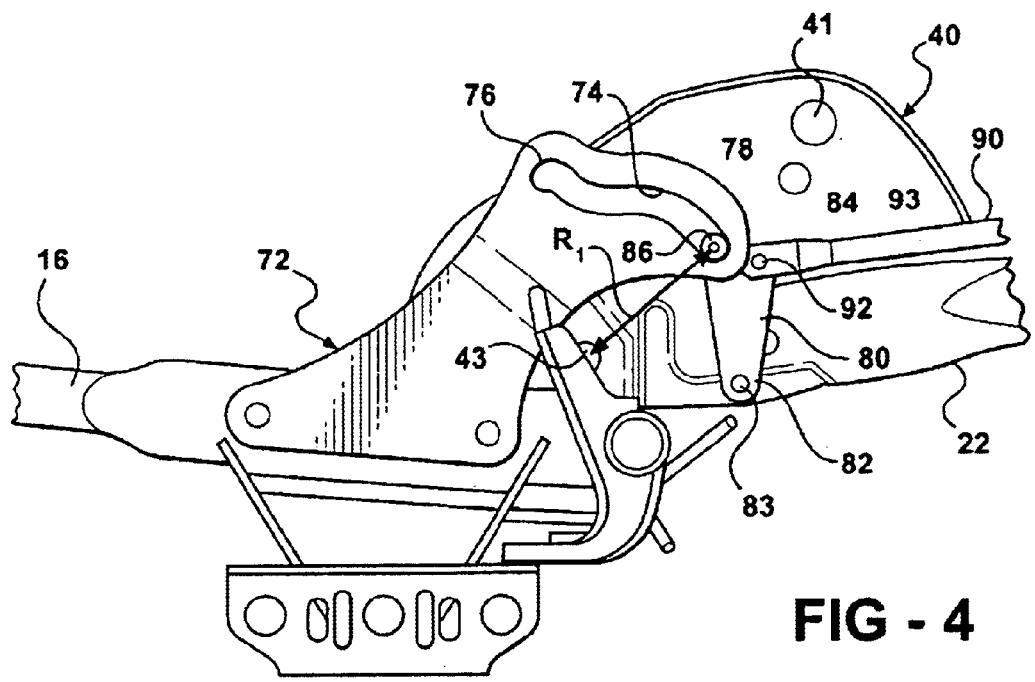
FIG. 4 is an enlarged side view of the mechanism for adjusting the head restraint with the seat back in the fully reclined seating position.
Figure 6:
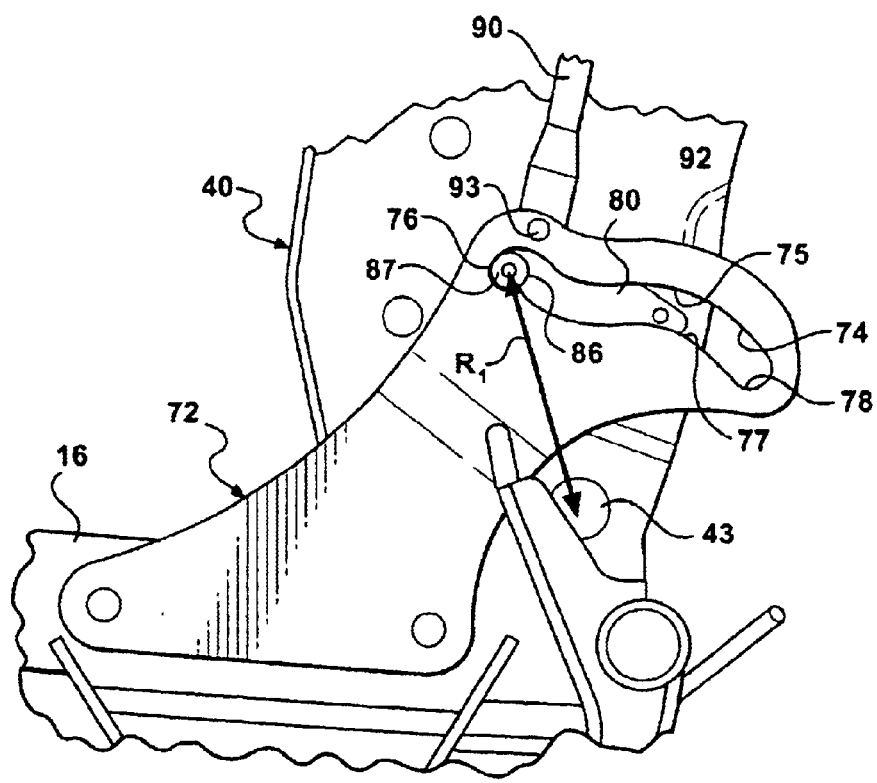
FIG. 6 is an enlarged side view of the mechanism for adjusting the head restraint with the seat back in an upright seating position.
Figure 5:
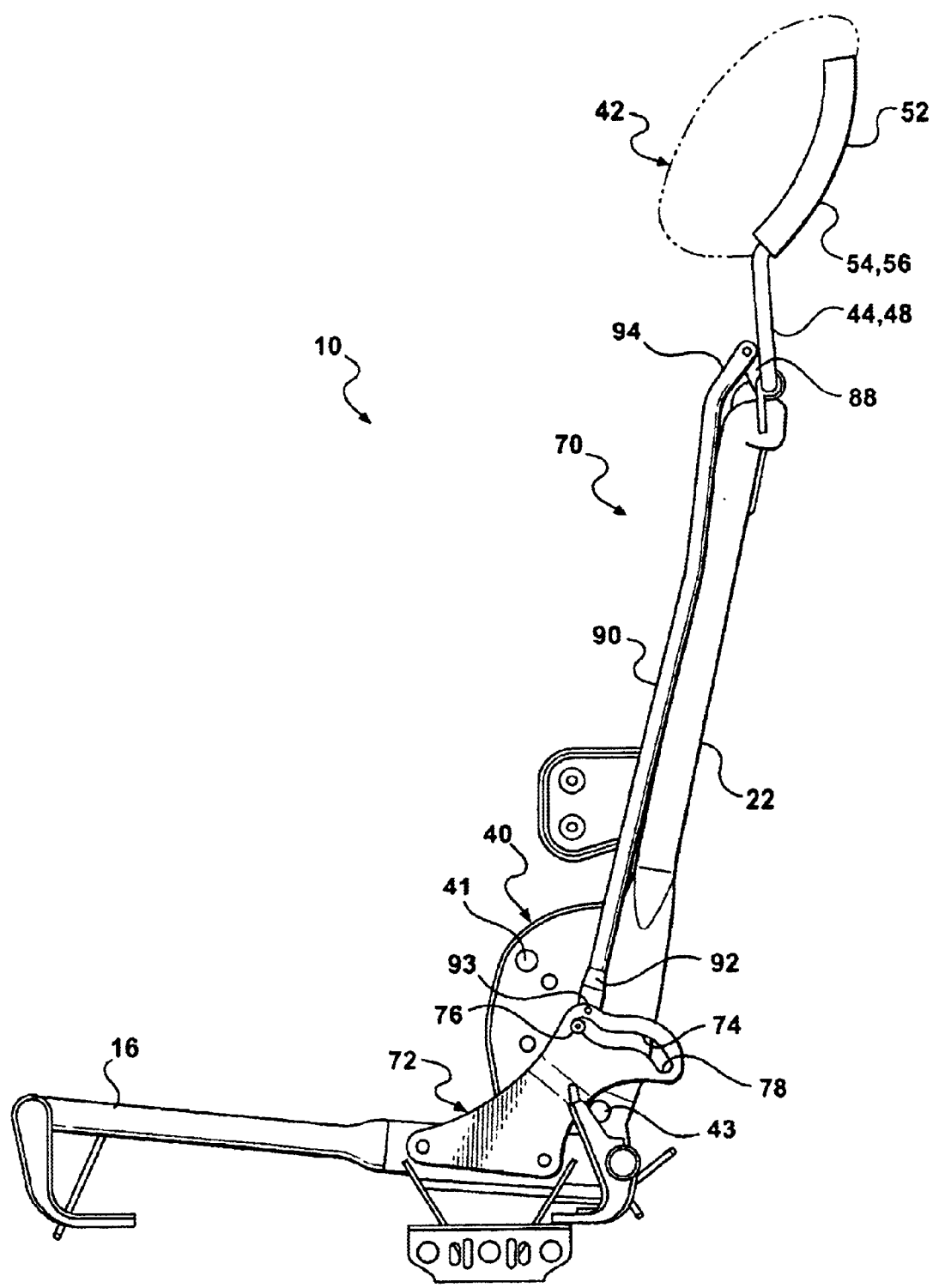
FIG. 5 is a side view of the seat assembly with the cushions removed from the seat back and seat cushion frames.
Figure 7:
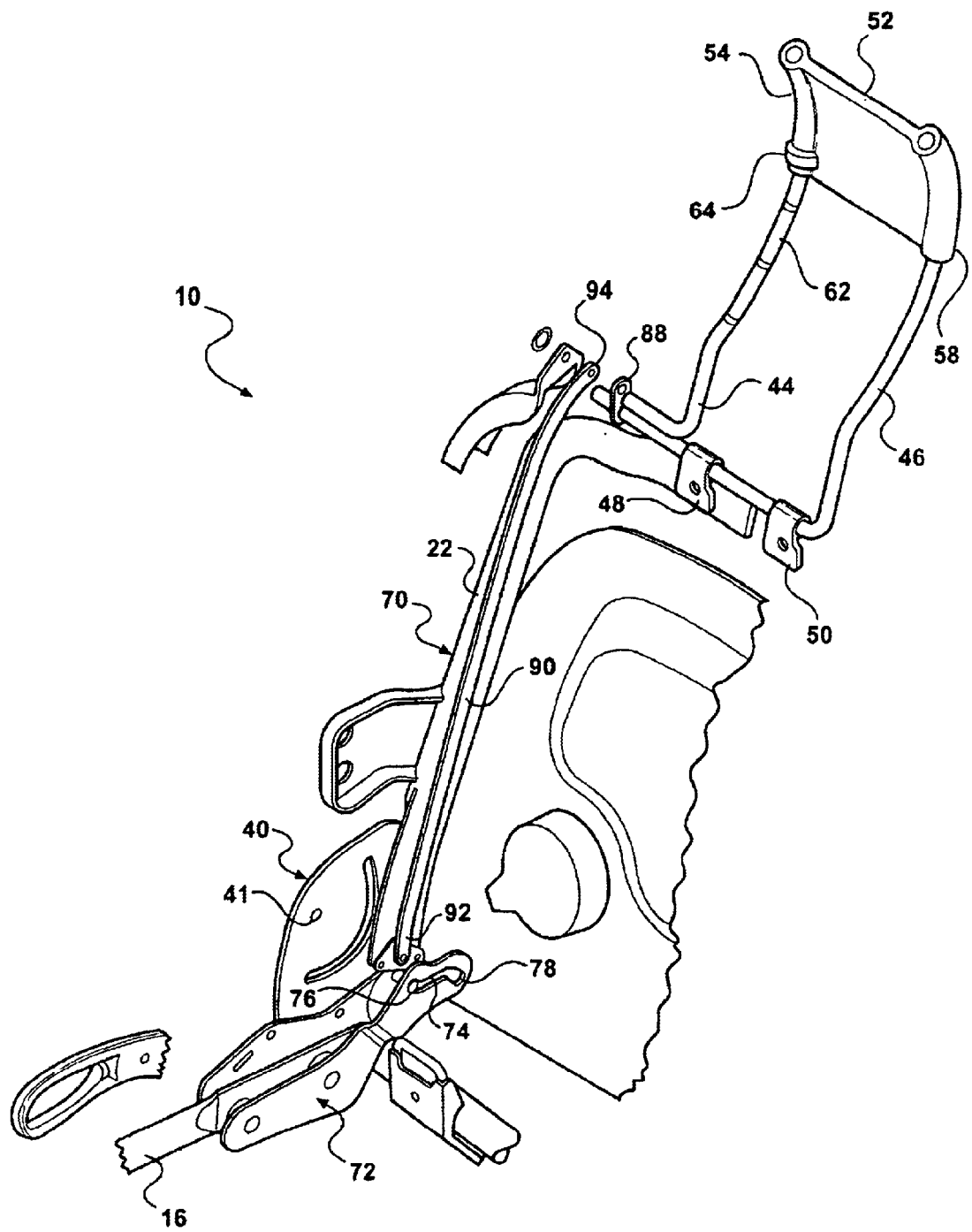
FIG. 7 is a partially exploded perspective view of the seat assembly.
Figure 8:
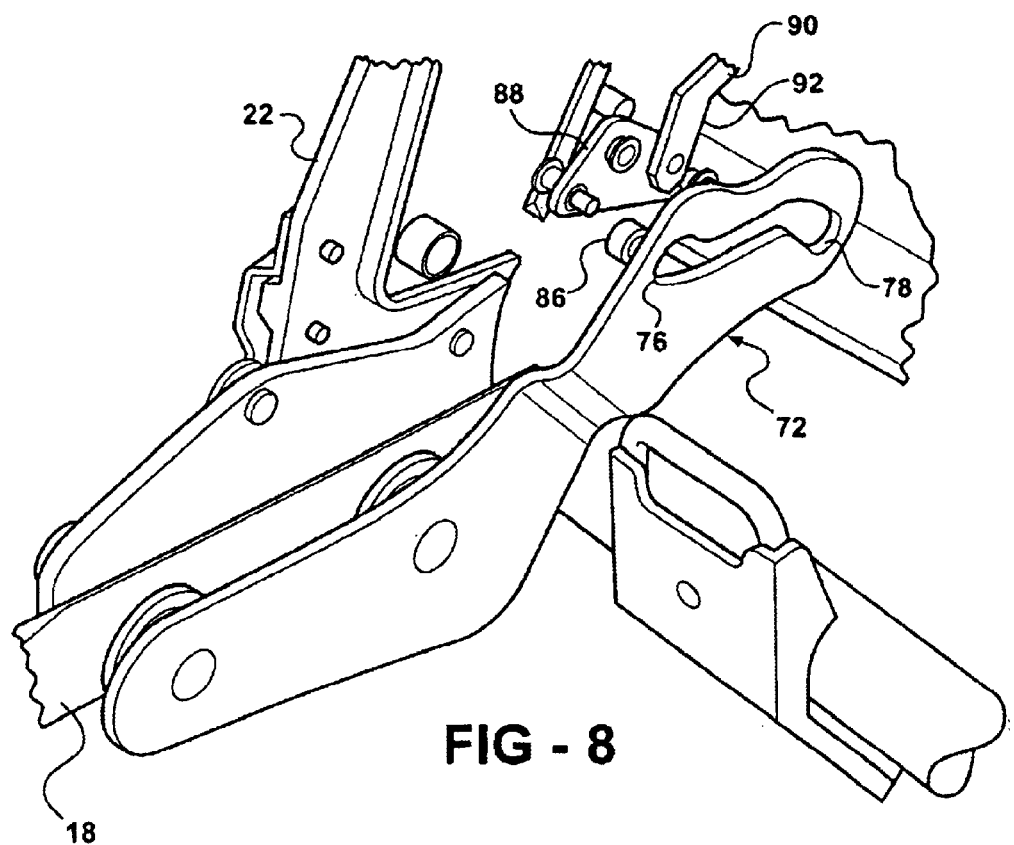
FIG. 8 is a partially exploded perspective view of the mechanism of the seat assembly of FIG. 7.

Referring to FIG. 3, the mechanism 70 further includes a lever arm 88 extending outwardly from the head restraint posts 44, 46 for controlling the pivotal movement of the head restraint 42 about the seat back 14 via the pivot brackets 48, 50. Finally, the mechanism 70 includes a control rod 90 extending longitudinally between a first end 92 and an opposite second end 94. The first end 92 is pivotally connected to the second end 84 of the rocker arm 80 at pivot 93 adjacent to and spaced laterally rearward of the roller 86 as shown in FIGS. 4 and 6. The second end 94 is pivotally connected to the distal end of the lever arm 88. Thus, as shown in FIGS. 2 and 5, the control rod 90 extends between the cam plate 72 on the seat cushion 12 and the lever arm 88 on the head restraint 42 along the seat back 14.

In operation, the angular position of the head restraint 42 relative to the seat back 14 is a function of the angular position of the seat back 14 relative to the seat cushion 12. That is, as the seat back 14 is pivotally reclined (in the clockwise direction as shown) from the upright seating position, shown in FIGS. 2 and 5, to a reclined position (towards the fully reclined position shown in FIG. 3) it is initially desirable to pivot the head restraint 42 relative to the seat back (in the counterclockwise direction as shown) and closer to the occupant's head for further support thereof. Specifically, when the seat back 14 is adjusted, or pivoted, rearwardly, for example from the upright seating position shown in FIGS. 2 and 5 towards the fully reclined position shown in FIG. 3, the cam plate 72 and rocker arm 80 connected to and movably with the seat back 14 force the roller 86 to travel along the cam slot 74 from the first end 76 toward the second end 78. As shown best in FIG. 4, the cam slot 74 is generally S-shaped, or sinusoidal, such that as the roller 86 travels along the cam slot 74, the cam slot 74 first pulls on the control rod 90 to rotate the lever arm 88 and pivot the head restraint 42 counterclockwise. Since the roller 86 and first end 92 of the control rod 90 are secured to the fixed rocker arm 80, the cam slot 74 controls the movement of the control rod 90, and thus, the lever arm 88. More specifically, the change in the radial distance R1 between the pivot axis 43 of the recliner 40 and the roller 86 caged within the fixed cam slot 74 forces the roller 86 to push or pull on the control rod 90 during pivotal movement of the seat back 14. The radial distance R1 may be varied by the shaped, or curvature, in the cam slot 74. For example, a curved profile extending towards or closer to the pivot axis 43 shortens the radial distance R1 and pulls on the control rod 90 to pivot the head restraint 42 towards the front surface 38 of the seat back 14, or in the counterclockwise direction of the Figures. As the seat back 14 approaches the fully reclined position, the curve, or slope, of the cam slot 74 changes to increase the radial distance R1 and instead push on the control rod 90 and lever arm 88 to pivot the head restraint 42 clockwise to align generally flush with the front surface 38 of the seat back 14 when the seat back 14 is generally flat or planar with the seat cushion 12. The opposite motion occurs when the seat back 14 is returned from the fully reclined position to the upright seating position Therefore, the mechanism 70 automatically and continuously adjusts and optimizes the position of the head restraint 42 relative to the seat back, and occupant's head, in response to pivotal movement of the seat back 14.

Figure 9:
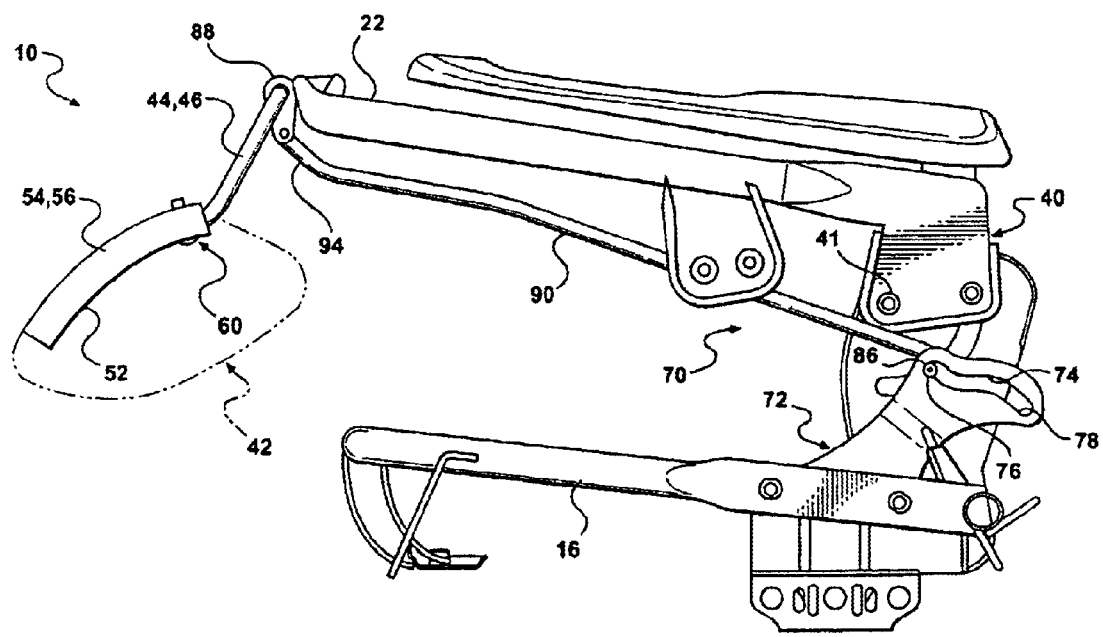
FIG. 9 is a side view of the seat assembly with the seat back in the forwardly folded flat position.
Figure 11:
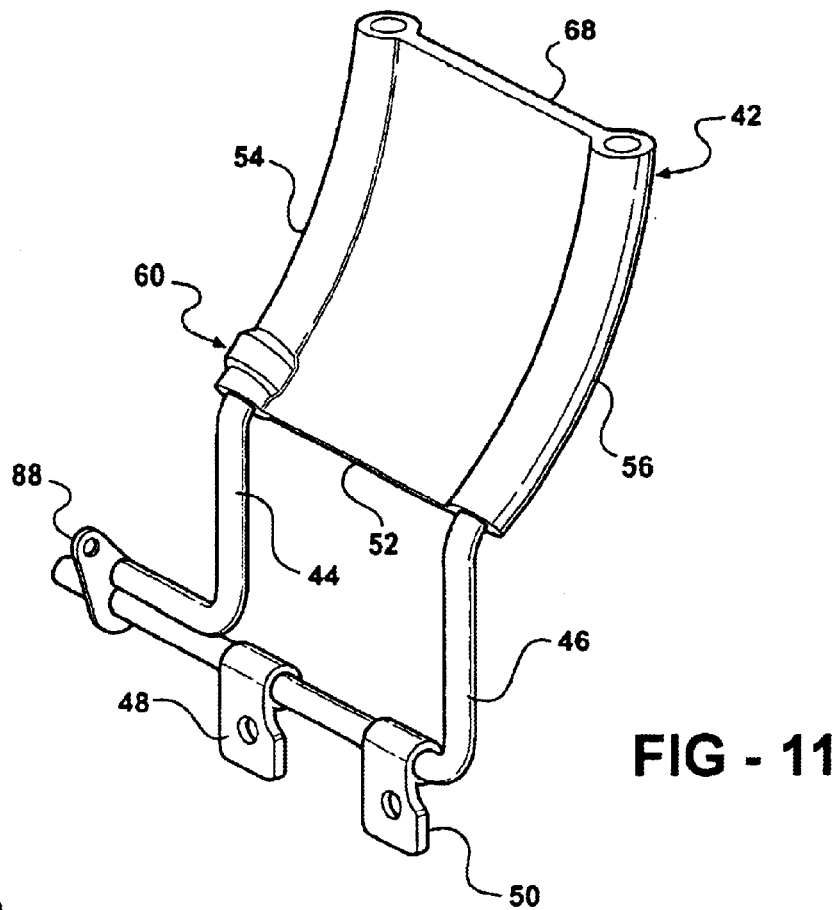
FIG. 11 is a perspective front view of the head restraint of the seat assembly.
Figure 12:
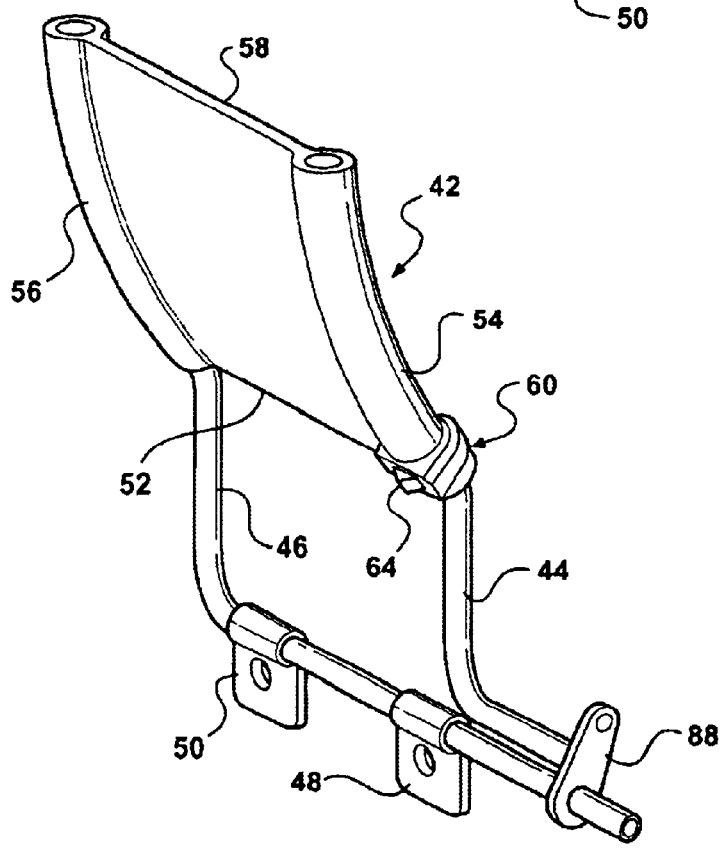
FIG. 12 is a perspective rear view of the head restraint.
Figure 13:
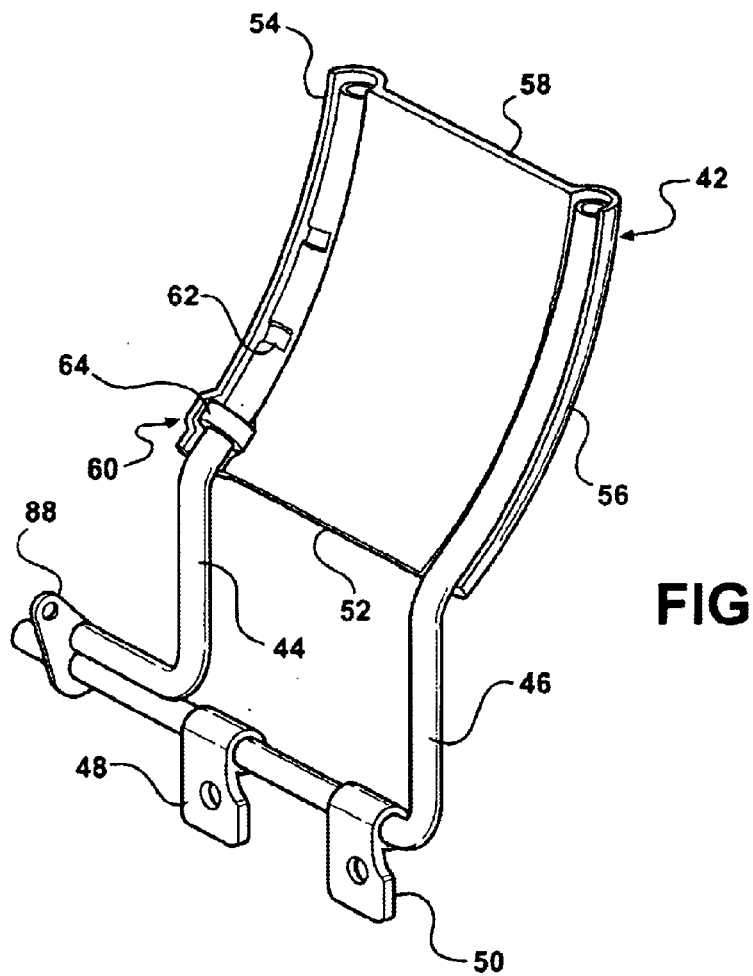
FIG. 13 is a partially broken perspective front view of the head restraint.

Furthermore, when the seat back 14 is pivoted to the forwardly folded flat position shown in FIG. 9, the roller 86 is stopped or held in abutment against the first end 76 of the cam slot 74 and as the distance between the first end 92 of the control rod 90 and the upper portion 34 of the seat back 14 increases, the lever arm 88 is pulled and pivots the head restraint 42 in the counterclockwise direction as shown until the head restraint 42 is disposed generally perpendicular to the front surface 38 of the seat back 14. This allows the head restraint 42 to clear any obstructions in front of the seat assembly 10, typically which are present in a vehicle setting, such as the dashboard or another seat of the vehicle.

The amount and direction of the pivotal movement of the head restraint 42 obtained in response to the pivotal movement of the seat back 14 may be tailored to meet the desires or requirements of a particular seating application by modifying the profile of the cam slot 74 and cam plate 72, control rod 90 and/or lever arm 88.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practiced other than as specifically described.

What is claimed is:

1. A seat assembly comprising:
   a seat cushion extending between front and rear portions;
   a seat back having a front surface for supporting the back of an occupant seated on said seat cushion and extending between an upper portion and a lower portion operatively connected to said rear portion of said seat cushion for pivotal movement relative to said seat cushion between a plurality of reclined seating positions;
   a head restraint having a front surface for supporting the head of the occupant seated on said seat cushion, said head restraint pivotally coupled to said upper portion of said seat back for movement relative to said seat back between a plurality of angled head supporting positions; and
   a mechanism operatively interconnecting said head restraint and said seat back for providing automatic and continuous pivotal movement of said head restraint to one of said head supporting positions in response to pivotal adjustment of said seat back to one of said reclined seating positions, wherein said mechanism includes a cam plate fixedly secured to said seat cushion and having a cam slot formed therein and operatively interconnected with said head restraint for controlling said pivotal movement of said head restraint between said plurality of head supporting positions in response to movement of said seat back between said plurality of reclined seating positions and a control rod extending between a first end pivotally connected to said head restraint and a second end coupled with said cam slot for forcing said movement of said head restraint between said plurality of head supporting positions in response to movement of said seat back between said plurality of reclined seating positions.

2. A seat assembly as set forth in claim 1 wherein said mechanism includes a rocker arm extending between a first end pivotally coupled to said seat back and a second end slidably coupled to said cam slot for allowing rotation of said rocker arm about said first end in response to movement of said seat back between said plurality of reclined seating positions.

3. A seat assembly as set forth in claim 2 wherein said second end of said control rod is pivotally connected to said rocker arm, whereby said head restraint is moved between said plurality of head supporting positions via rotation of said rocker about said first end of said rocker and along said cam slot in response to movement of said seat back between said plurality of reclined seating positions.

4. A seat assembly as set forth in claim 3 including a roller rotatably coupled to said second end of said rocker arm, said roller adapted for rolling engagement with said cam slot to guide movement of said second end of said rocker arm along said cam slot upon rotation of said rocker arm about said first end and during said movement of said seat back.

5. A seat assembly as set forth in claim 4 wherein said mechanism includes a lever arm extending from said head restraint and having a distal end pivotally coupled to said first end of said control rod for moving said head restraint between said plurality of head supporting positions in response to movement of said seat back between said plurality of reclined seating positions.

6. A seat assembly as set forth in claim 5 wherein said cam slot includes a predetermined curved profile defined by spaced apart side edges for selectively controlling movement of said head restraint between said plurality of angled head supporting positions in response to said pivotal adjustment of said seat back.

7. A seat assembly as set forth in claim 6 wherein said cam slot includes an abutment end for retaining movement of said roller and rocker arm and forcing said head restrain to pivot between one of said angled head supporting positions and a forwardly stowed position defined by said front of said head restraint being generally perpendicular to said front surface of said seat back in response to pivotal movement of said seat back between said plurality of reclined seating positions and a forwardly folded flat position overlying said seat cushion.

8. A seat assembly comprising:
   a seat cushion extending between front and rear portions;
   a seat back having a front surface for supporting the back of an occupant seated on said seat cushion, said seat back extending between an upper portion and a lower portion operatively connected to said rear portion of said seat cushion for pivotal movement relative to said seat cushion between at least one reclined seating position and a forwardly folded flat position overlying said seat cushion;
   a head restraint having a front surface for supporting the head of the occupant seated on said seat cushion, said head restraint pivotally coupled to said upper portion of said seat back for movement relative to said seat back between at least one head supporting position and a forwardly stowed position defined by said front of said head restraint being generally perpendicular to said front surface of said seat back; and
   a mechanism operatively interconnecting said head restraint and said seat back for providing automatically pivoting said head restraint between head supporting position and said forwardly stowed position in response to pivotal adjustment of said seat back between reclined seating position and said forwardly folded flat position, wherein said mechanism includes a cam plate fixedly secured to said seat cushion and having a cam slot formed therein and operatively interconnected with said head restraint for controlling said pivotal movement of said head restraint between said head supporting position and said forwardly stowed position in response to movement of said seat back between said reclined seating position and said forwardly folded flat position.

9. A seat assembly as set forth in claim 8 wherein said mechanism includes a control rod extending between a first end pivotally connected to said head restraint and a second end coupled with said cam slot forcing said movement of said head restraint between said head supporting position and said forwardly stowed position in response to movement of said seat back between said reclined seating position and said forwardly folded flat position.

10. A seat assembly as set forth in claim 9 wherein said mechanism includes a rocker arm extending between a first end pivotally coupled to said seat back and a second end slidably coupled with said cam slot for rotation of said rocker arm about said first end in response to movement of said seat back between a plurality of reclined seating positions.

11. A seat assembly as set forth in claim 10 wherein said second end of said control rod is pivotally connected to said rocker arm, whereby said head restraint is moved between a plurality of head supporting positions via rotation of said rocker about said first end of said rocker in response to movement of said seat back between said plurality of reclined seating positions.

12. A seat assembly as set forth in claim 11 including a roller rotatably coupled to said second end of said rocker arm, said roller adapted for rolling engagement with said cam slot to guide movement of said second end of said rocker arm along said cam slot upon rotation of said rocker arm about said first end and during said movement of said seat back between said plurality of reclined seating positions.

13. A seat assembly as set forth in claim 12 wherein said mechanism includes a lever arm extending from said head restraint and having a distal end pivotally coupled to said first end of said control rod for moving said head restraint between said head supporting position and said forwardly stowed position in response to movement of said seat back between said reclined seating position and said forwardly folded flat position.

14. A seat assembly as set forth in claim 13 wherein said cam slot includes a predetermined curved profile defined by spaced apart side edges for selectively controlling movement of said head restraint between said plurality of angled head supporting positions in response to said pivotal adjustment of said seat back between said reclined seating positions.

* * * * *